(12) United States Patent
Brenton et al.

(10) Patent No.: US 9,445,250 B2
(45) Date of Patent: Sep. 13, 2016

(54) EMERGENCY CALL PLACEMENT SYSTEMS AND METHODS

(71) Applicant: GreatCall, Inc., San Diego, CA (US)

(72) Inventors: Scott Brenton, San Diego, CA (US);
Krijn van der Raadt, San Diego, CA (US); Kotaro Matsuo, San Diego, CA (US); Dean Williams, San Diego, CA (US); Jonathan J. Sieg, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

(21) Appl. No.: 14/588,011

(22) Filed: Dec. 31, 2014

(65) Prior Publication Data

US 2015/0111521 A1    Apr. 23, 2015

Related U.S. Application Data

(63) Continuation-in-part of application No. 13/004,481, filed on Jan. 11, 2011.

(51) Int. Cl.
*H04M 11/04* (2006.01)
*H04W 4/22* (2009.01)
*H04W 4/02* (2009.01)

(52) U.S. Cl.
CPC .............. *H04W 4/22* (2013.01); *H04M 11/04* (2013.01); *H04W 4/02* (2013.01); *H04M 2242/04* (2013.01)

(58) Field of Classification Search
CPC .................. H04M 3/5116; H04M 2242/04
USPC ............... 455/404.2, 404.1, 466, 445, 426.2, 455/456.1, 435.1, 414.1, 417; 379/211.02, 379/329, 207.02
See application file for complete search history.

(56) References Cited

U.S. PATENT DOCUMENTS

| | | | |
|---|---|---|---|
| 3,663,762 | A | 5/1972 | Joel, Jr. |
| 4,144,411 | A | 3/1979 | Frenkiel |
| 5,471,204 | A | 11/1995 | Kudoh et al. |
| 5,473,672 | A | 12/1995 | Khalid |
| 6,044,257 | A | 3/2000 | Boling et al. |
| 6,226,510 | B1 | 5/2001 | Boling et al. |
| 6,473,612 | B1 | 10/2002 | Cox et al. |
| 6,535,585 | B1 | 3/2003 | Hanson et al. |
| 6,622,021 | B1 | 9/2003 | Takala |
| 6,636,732 | B1 | 10/2003 | Boling et al. |
| 6,671,366 | B1 | 12/2003 | Isotalo |

(Continued)

FOREIGN PATENT DOCUMENTS

| | | |
|---|---|---|
| KR | 100673240 B1 | 7/2005 |
| KR | 10-0673240 B1 | 1/2007 |

*Primary Examiner* — Kiet Doan
(74) *Attorney, Agent, or Firm* — Kilpatrick Townsend & Stockton LLP

(57) ABSTRACT

Systems and methods are provided for connecting a caller to an alternate telephone number, such as 9-1-1, when a call to a private response center does not result in immediate assistance, or when it is recognized by the private response center that emergency services are needed at the caller's location. In one example, when the call to the private response center does not connect, the private response center may explicitly reject the call, causing the calling device to take action to call an emergency services telephone number, if needed. In another example, the call to the private response center may reach a customer service representative who recognizes that emergency services are needed. A signal is then sent to the calling device causing the device to call 9-1-1 directly.

7 Claims, 8 Drawing Sheets

(56) References Cited

U.S. PATENT DOCUMENTS

| | | |
|---|---|---|
| 7,092,695 B1 | 8/2006 | Boling et al. |
| 7,174,011 B2 | 2/2007 | Kortum et al. |
| 7,286,860 B2 | 10/2007 | Harris |
| 7,660,401 B2 | 2/2010 | Gamble |
| 7,706,831 B2 | 4/2010 | Richardson et al. |
| 7,890,134 B2 | 2/2011 | Richardson et al. |
| 8,489,066 B2 | 7/2013 | Imming et al. |
| 2002/0013141 A1 | 1/2002 | Cox et al. |
| 2004/0067784 A1 | 4/2004 | Kubo et al. |
| 2004/0252679 A1 | 12/2004 | Williams et al. |
| 2005/0085257 A1 | 4/2005 | Laird et al. |
| 2006/0003809 A1 | 1/2006 | Boling et al. |
| 2006/0233320 A1 | 10/2006 | Latter et al. |
| 2006/0270391 A1* | 11/2006 | Kim ................... H04W 4/16 455/414.1 |
| 2007/0087765 A1 | 4/2007 | Richardson et al. |
| 2008/0012760 A1 | 1/2008 | Derrick et al. |
| 2008/0012761 A1 | 1/2008 | Derrick et al. |
| 2008/0096521 A1* | 4/2008 | Boling et al. ............ 455/404.2 |
| 2008/0107252 A1 | 5/2008 | Forte |
| 2009/0029716 A1* | 1/2009 | Thomas ............ G01N 33/0075 455/456.1 |
| 2009/0109959 A1 | 4/2009 | Elliott et al. |
| 2009/0203350 A1* | 8/2009 | Gottlieb .................. 455/404.1 |
| 2010/0002865 A1 | 1/2010 | Kennedy |
| 2010/0222044 A1 | 9/2010 | Baccay et al. |
| 2010/0260107 A1 | 10/2010 | Shuman et al. |
| 2010/0297986 A1 | 11/2010 | Cermak et al. |
| 2010/0304704 A1* | 12/2010 | Najafi .................... 455/404.1 |
| 2010/0322399 A1 | 12/2010 | Couse et al. |
| 2011/0111736 A1 | 5/2011 | Dalton et al. |
| 2011/0117875 A1* | 5/2011 | Oh et al. ................ 455/404.1 |
| 2012/0178403 A1 | 7/2012 | Sieg et al. |
| 2012/0178405 A1 | 7/2012 | Sieg et al. |

* cited by examiner

EMERGENCY CALL PLACEMENT SYSTEMS AND METHODS

CROSS-REFERENCES TO RELATED APPLICATIONS

This application is a continuation-in-part of U.S. patent application Ser. No. 13/004,481 filed Jan. 11, 2011, entitled "EMERGENCY CALL REDIRECTION SYSTEMS AND METHODS," the entire disclosure of which is hereby incorporated by reference as if fully set forth herein.

BACKGROUND

Nearly all locations within the United States and Canada are now served by "9-1-1" emergency telephone service, and many other countries have similar services. In the 9-1-1 system, calls to the telephone number 9-1-1 are specially routed to a public safety answering point (PSAP), where a specially-trained dispatcher can assess the nature of the emergency, offer assistance, dispatch emergency services or law enforcement personnel to the source of the call, or provide other services. Many PSAPs are interconnected to allow routing calls and other information between them. The 9-1-1 service facilitates rapid response by the appropriate authorities in cases of emergency.

Some private organizations offer telephone-based assistance services, for example navigation assistance, concierge services, health monitoring services, and the like. While these private assistance services are not intended to replace the 9-1-1 system, in some cases a client of a private telephone assistance service may call the familiar private assistance service in the event of an emergency, rather than 9-1-1. In such a case, it is highly desirable that the client receive emergency assistance without delay.

BRIEF SUMMARY

According to one aspect, a communications device comprises an input interface, a transceiver, a microprocessor, and a computer readable memory. The computer readable memory holds microprocessor instructions that, when executed by the microprocessor, cause the communications device to receive an input via the input interface and in response to the input, place a first outgoing telephone call to a call recipient that is not a public safety answering point. The instructions further cause the communications device to receive from the call recipient via the transceiver an electronic signal and in response to the receipt of the electronic signal, place a second call to a public safety answering point. In some embodiments, the electronic signal is received while the first telephone call has not reached a person, and the electronic signal indicates that the first call is rejected by the recipient. In some embodiments, the instructions, when executed by the processor, further cause the communications device to prompt a user of the communications device for an indication that the second call is to be placed, and place the second call upon receipt of the indication from the user that the second call is to be placed. In some embodiments, the instructions, when executed by the processor, further cause the communications device to automatically place the second call. In some embodiments, the electronic signal is received after the first telephone call reaches a person, and the electronic signal indicates that the communication device is to place the second call to the public safety answering point, and the communications device places the second call automatically in response to the electronic signal. In some embodiments, the microprocessor instructions, when executed by the microprocessor, further cause the communications device to join the first and second outgoing calls into a three-way call. The electronic signal may be received as a short message service (SMS) message. The electronic signal may be received as one or more dual-tone multiple-frequency (DTMF) tones. The electronic signal may be received as a third telephone call.

According to another aspect, a method of operating a call center comprises receiving, via an electronic communication network, a first telephone call from a communications device, and connecting the received call with a customer service representative. The method further includes sending, over the electronic communication network, an electronic signal directing the communications device to place a second telephone call and that the second telephone call is to be directed to a public safety answering point. In some embodiments, sending the electronic signal comprises sending an SMS message. In some embodiments, sending the electronic signal comprises sending one or more dual-tone multiple-frequency (DTMF) tones. In some embodiments, sending the electronic signal comprises placing a third telephone call, the third call directed from the call center to the communications device. In some embodiments. the method further comprises recognizing that the user of the communications device is in an emergency situation.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, some of the operations may be performed in parallel or concurrently. In addition, the order of the operations may be re-arranged in some cases. A process may be terminated when its operations are completed, but could have additional steps not included in a figure. Furthermore, embodiments may be implemented by manual techniques, automatic techniques, or any combination thereof.

Figure 1:
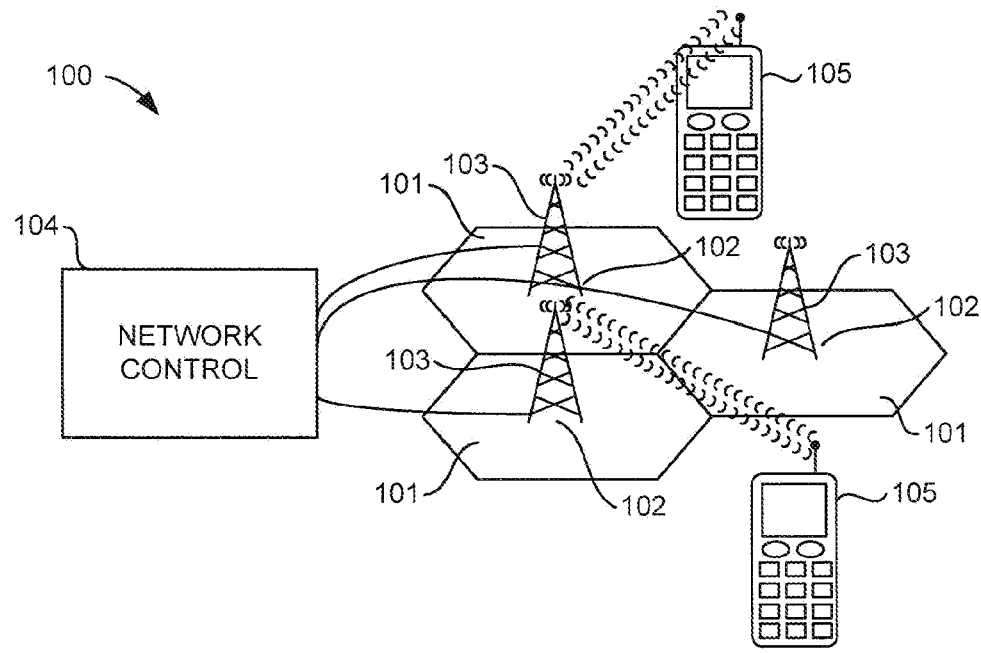
FIG. 1 is a simplified schematic diagram of a cellular telephone network.

FIG. 1 is a simplified schematic diagram of a cellular telephone network 100. Cellular networks are an especially efficient way to provide mobile telephone service. Each cell 101 is served by a base station 102, which often includes an antenna mounted on a tower 103. Each cellular telephone active in a particular cell can hi-directionally interact with the base station of the cell, enabling full duplex communication of data and/or voice. Each cell 101 is capable of communicating with mobile telephones 105 within the respective cell 101 according to a physical interface scheme (e.g., CDMA, LTE, GSM, GPRS, WiMax, etc.). Each base station 102 typically is capable of communicating simultaneously with several dozen different mobile telephones 105.

Adjacent cells 101 use different frequencies or coding to avoid interference. In this way, many mobile telephones can be supported using a limited spectra. The size and density of the cells 101 may be determined in part by the demand for service and the geography of the area being served. While only three cells 101 are shown in FIG. 1, many cells 101 may be present. Special hand-off protocols may be used for maintaining communication with a particular telephone that moves from one cell 101 to another during a call.

As shown in FIG. 1, each base station 102 communicates with a network controller 104. It will be understood that FIG. 1 is highly simplified, and network controller 104 represents a wide array of hardware, software, and other components performing a wide variety of functions. For example, network controller 104 may route calls between cells 101 and outside telephone providers, monitor telephone usage, maintain billing records for individual telephone accounts, perform diagnostic tests, and perform many other functions.

Figure 2:
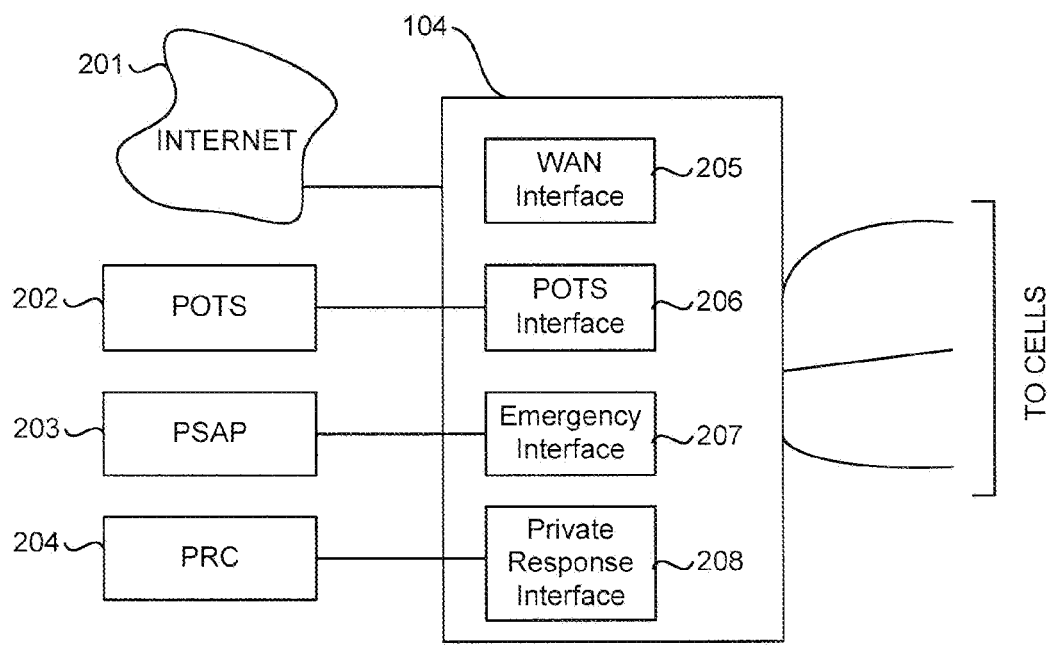
FIG. 2 is a simplified block diagram of network controller illustrating interfaces in accordance with an embodiment.

Network controller 104 may also include interfaces between network 100 and other networks, organizations, or services. For example, FIG. 2 is a block diagram of network controller 104, still highly simplified, illustrating interfaces 205, 206, 207, 208 to the Internet 201, a plain old telephone system (POTS) 202, a PSAP 203, and a private response center (PRC) 204. Other interfaces to location services, data services, billing systems, toll-free number routing services, etc. are typical, but not shown.

WAN interface 205 connects network 100 with the Internet 201. The Internet 201 is a global system of interconnected computer networks, and enables digital communication between computers. Applications of the Internet 201 include the carrying of electronic mail, audio and video feeds, and other kinds of digital messages. One especially popular use of the Internet 201 is for the hosting and viewing of interlinked documents on the World Wide Web. Many modern mobile telephones, including cellular telephones of the kind supported by network 100, include the capability to access documents and communications through the Internet 201, for example sending and receiving electronic mail and viewing web pages. Other embodiments could use a wide area network (WAN) separate from or tunneled through the Internet 201.

POTS interface 206 connects network 100 with the plain old telephone system (POTS) 202. POTS 202 comprises, for example, a large number of traditional wireline telephones and other communications equipment, as well as the infrastructure required to support them. Many residential and small business telephones are part of POTS 202, which may still support telephone hardware that is decades old. POTS interface 206 enables users of mobile telephones that are part of network 100 to call telephones that utilize POTS 202, and vice versa.

Emergency interface 207 connects network 100 to PSAP 203, so that calls to the 9-1-1 emergency number made by mobile phone users on network 100 can be routed to a PSAP 203 or routed between multiple PSAPs 203. The PSAP 203 may be additionally served by POTS 202. or by another system.

Private response interface 208 connects network 100 to private response center 204.

For example, private response center 204 may be operated by a service provider who offers personalized assistance to clients who subscribe to the service. In some embodiments, the service provider may offer personal health management advice, concierge services, navigational assistance, technical support for telephones used in conjunction with the service, or other kinds of personalized services deliverable by telephone. Private response center 204 may be staffed by customer service representatives who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. Alternatively, PRC 201 may be a fully automated service designed to operate without human intervention.

Private response center (PRC) 204 is not intended to be a substitute for the PSAP 203. A client of the service offered by private response center 204 would be expected and encouraged to dial 9-1-1 in the event of an emergency.

In one example scenario, the service provider that operates private response center 204 may also be a cellular telephone service provider, and may offer a private assistance service as an adjunct to cellular telephone service. The private response center 204 can be contacted for non-emergency service through a phone number, speed dial or other shortcut, for example by activating a 5 and * key combination. The connection between network controller 104 and private response center 204 is schematic. The actual connection could be by way of the Internet 201, a wireless connection, a voice-over-Internet-protocol (VOIP) connection, a cellular telephone connection, or private response center 204 could be reached through POTS 202, or any other suitable connection method that enables a telephone user to reach private response center 204 by calling a telephone number. Private response center 204 may be reachable via multiple methods.

Figure 3:
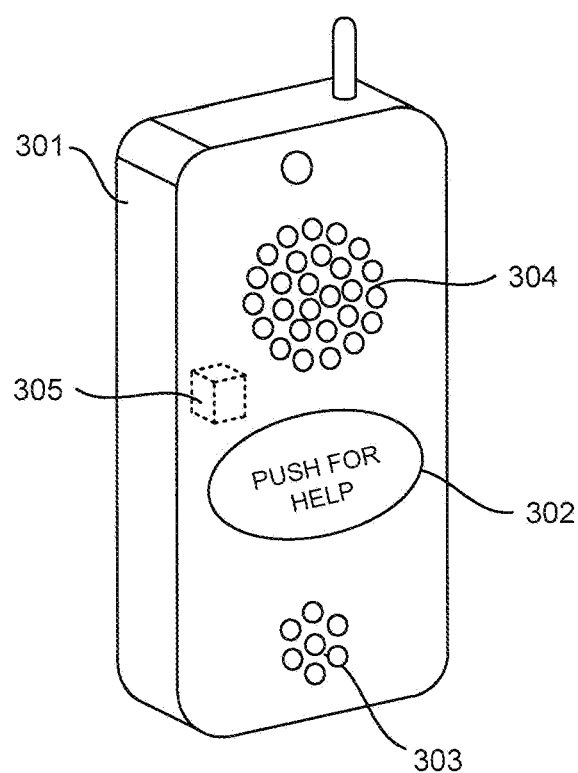
FIG. 3 illustrates an exemplary communications device.

FIG. 3 illustrates a specialized communications device 301 that may be especially useful for some clients of private response center 204. Exemplary communications device 301 may internally be a fully-featured cellular telephone, but has a simplified input interface comprising only one button 302. Communications device 301, may also be referred to as a "fob" or an "emergency communicator." A client of private response center 204 may wear communications device 301 on his or her person, and can use it to contact private response center 204 whenever assistance is needed. For example, communications device 301 may be configured to dial private response center 204 when button 302 is pressed. This greatly simplified input interface may be especially helpful to clients with impairments such as poor vision or coordination that make it difficult to operate a conventional cellular telephone that has many small keys. The single-button interface assures that private response center 204 will be called without the client having to press a sequence of keys. In the event of an emergency, the client may be distraught or disoriented, and the simplified input interface increases the chance of the client reaching private response center 204.

While embodiments are described using simplified communications device 301, other kinds of communications devices could also be used. For example, embodiments could utilize a conventional cellular telephone or smart phone having a full telephone keypad or even an alphanumeric keyboard. Other embodiments could utilize a pager, personal digital assistant, portable computer, or any other kind of communications device usable within the scope of the appended claims.

Communications device 301 further includes a microphone 303 and a speaker 304, enabling telephone or telephone-like communication. In some embodiments, communications device 301 does not even include a display, although one may be included on which messages can be shown to the user. In some embodiments, communications device 301 may include an accelerometer 305. Accelerometer 305 may be used, for example, to detect that the user of communications device 301 has fallen, so that private response center 204 can be automatically contacted in that event. Accelerometer 305 may also be used to provide input to communications device 301, and may thus be considered part of the input interface of communications device 301. Microphone 303 may also be considered part of the input interface. That is, the input interface of example communications device 301 comprises one and only one button 302, and also comprises microphone 303 and accelerometer 305. Many other input interface configurations are possible, including configurations having more or fewer input devices. More details about the internal architecture of communications device 301 are given below.

Figure 4:
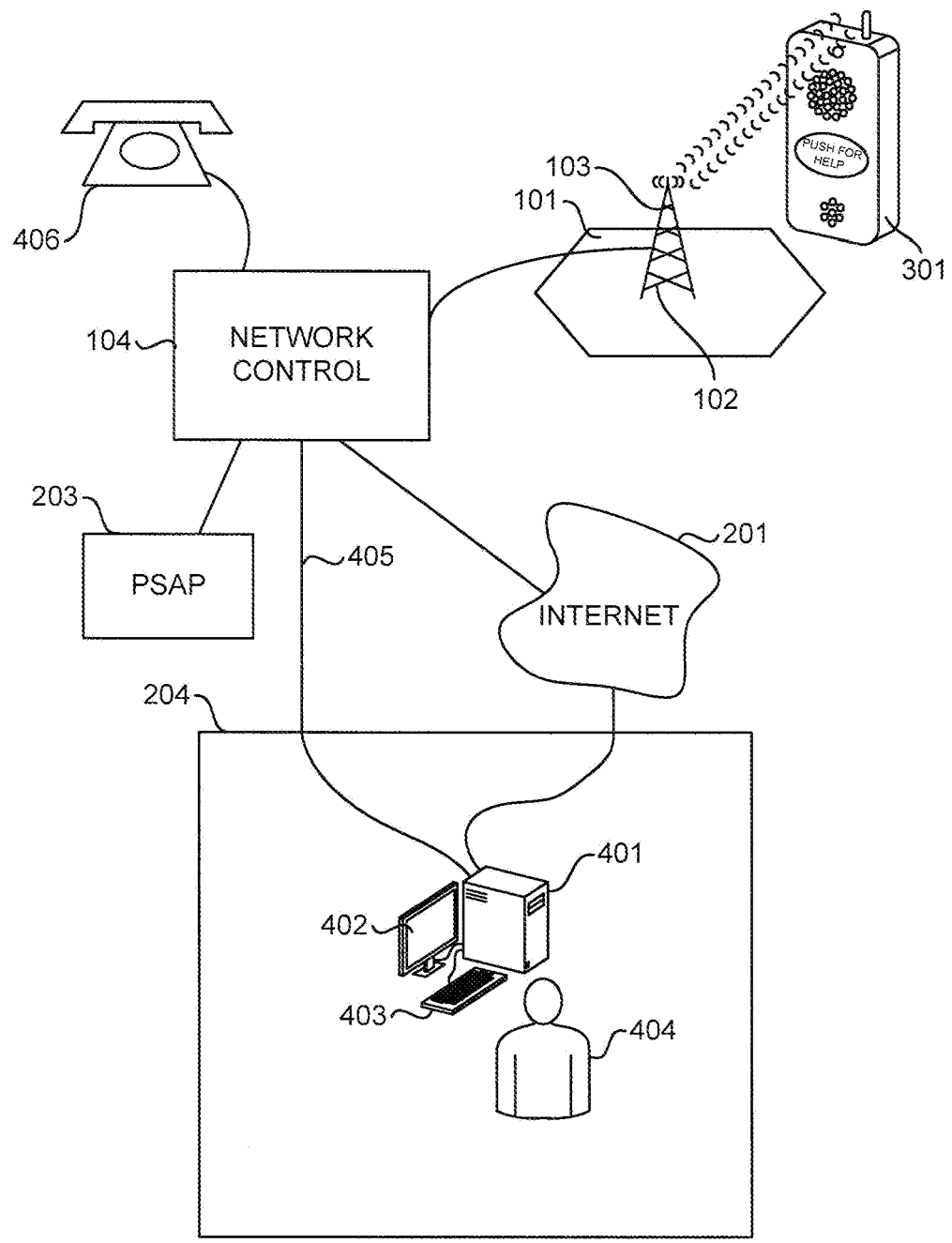
FIG. 4 illustrates entities involved in a typical scenario in accordance with an embodiment.

FIG. 4 illustrates the entities involved in a typical scenario in accordance with an embodiment. As shown in FIG. 4, private response center 204 preferably comprises a computer system 401 that facilitates many of the functions of private response center 204. Computer system 401 includes a display screen 402 and an input device 403 for displaying information to and receiving inputs from a service representative 404. Input device 403 may be, for example, a keyboard, mouse, or other kind of input device or a combination of input devices. While computer system 401 is depicted in FIG. 3 as a single, stand-alone computer, computer system 401 may include multiple interconnected computers, which may be collocated or widely distributed. Computer system 401 may include various forms of data storage, including volatile and nonvolatile memory, and long term data storage. At least some of the data storage holds instructions executable by a processor of computer system 401 to perform functions in accordance with embodiments. In the example of FIG. 4, private response center 204 is connected to network controller 104 through multiple channels, including the Internet 201, and a telephone connection 405, which may be a wireline connection, wireless connection, or any other connection that enables private response center 204 to make and receive telephone calls. Many other arrangements are possible. For example, private response center 204 may be able to make and receive telephone calls over the Internet 201 using a voice-over-IP system.

As is explained above, a client of private response center 204 may use communications device 301 in a variety of scenarios. For example, the client may simply be driving and may wish to obtain driving directions, or the name of a nearby restaurant. However, the client may also use communications device 301 in the event of an emergency, such as an auto accident, a fall in the home, a sudden medical emergency, or other situation. While the client may be encouraged to call 9-1-1 directly in such a situation, the client may simply be familiar with the use of communications device 301 and may prefer to use it to call PRC 204 rather than calling 9-1-1 directly. Or the client may not appreciate the urgency of his or her situation, and may not realize that a call to 9-1-1 would have been appropriate. Or the client may not be near another telephone and may use communications device 301 of necessity. If the client's call from communications device 301 to private response center 204 is answered quickly, then customer service representative 404 may recognize that the client has an emergency, and may redirect the client's call to PSAP 203. Or customer service representative 404 may set up a conference call that includes the client, customer service representative 404, and PSAP 203 so that customer service representative 404 can advocate on behalf of the client. For example, customer service representative 404 may be able to access information about the client, such as a list of medications the client is taking, and provide the information to the emergency services personnel at PSAP 203.

Problems may arise, however, if the call to private response center 204 does not complete. For example, a partial telephone network outage or other problem may exist, so that the call to private response center 204 fails to connect to private response center 204, the intended receiving party. In another example of failure to complete, the call may be answered by private response center 204, but due to high call volume or other circumstances may be placed on hold and not taken up immediately by customer service representative 404. If the call relates to an emergency, it is highly desirable that some mechanism be provided for the client to be redirected to PSAP 203 as soon as possible.

In one embodiment, communications device 301 recognizes that the call failed to complete. However, due to the simple input interface of communications device 301, communications device 301 has no way to "know" whether the call relates to an emergency, or relates to some non-emergency request for assistance. Accordingly, communications device 301 may be configured to carry out a sequence of steps designed to connect the client to PSAP 203 as quickly as possible in an emergency, but to preferably avoid calls to 9-1-1 when no emergency is present.

Figure 5:
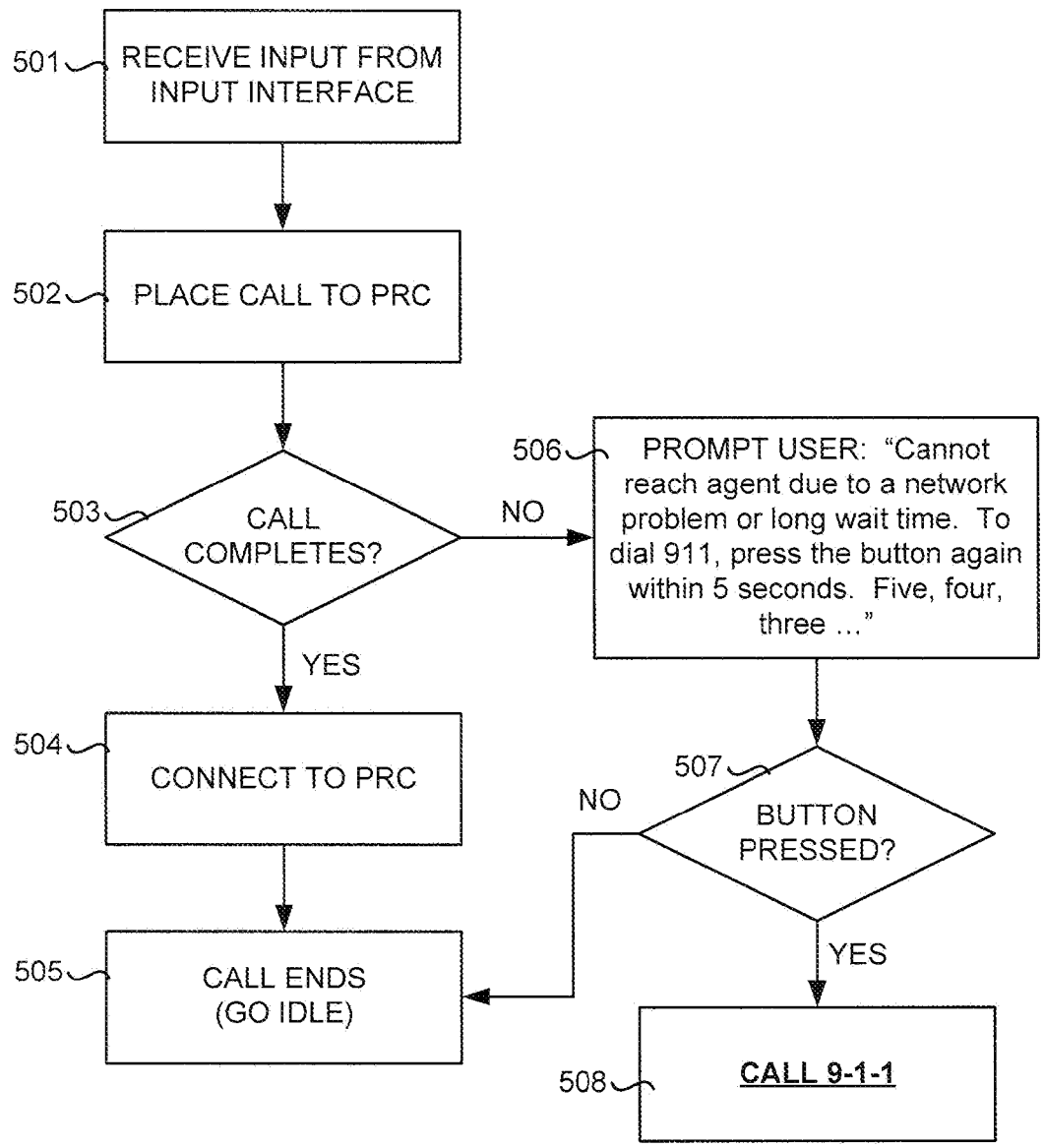
FIG. 5 illustrates a sequence of operations that may be performed by a communications device, in accordance with embodiments.

FIG. 5 illustrates one sequence of operations that may be performed by communications device 301, in accordance with embodiments.

In step 501, communications device 301 receives an input from its input interface. For example, communications device 301 may recognize that button 302 has been pressed. Communications device 301 then places a call to private response center 204 at step 502. If the call goes through as normal, as determined in step 503, communications device 301 connects to private response center 204 at step 504. Customer service representative 404 may then render assistance to the client. When the purpose of the call has been served, the call can be ended at step 505, and communications device 301 goes idle. In some embodiments, the client may terminate the call by pressing button 302 a second time, or some other mechanism may be used to end the call. For example, communications device 301 may recognize that private response center 204 has disconnected, and may enter the idle state automatically.

If the check at step 503 determines that the call to private response center 204 did not complete, then communications device 301 may prompt the client to indicate whether the call relates to an emergency or not. For example, communications device 301 may recognize that the call to private response center 204 did not complete, and may play an audible message through speaker 304, indicating communications device 301 will call 9-1-1 if button 302 is pressed again within a predetermined time interval. As is shown in FIG. 5, the interval may be five seconds, but any other suitable interval may be used.

At step 507, communications device 301 determines whether button 302 was pressed or not. If not, communications device 301 enters its idle state. However, if button 302 was pressed, that is, the client indicated that 9-1-1 should be called, communications device 301 calls 9-1-1 at step 508. The network outage or other problem that caused the original call to fail may not hinder the 9-1-1 call. In this way, communications device 301 may connect the client to 9-1-1 in an emergency during which private response center 204 cannot be reached, but unnecessary calls to 9-1-1 are avoided. In this example, the default behavior of communications device 301 is to not call 9-1-1 when private response center 204 cannot be reached.

Many variations on this example sequence are possible. For example, the prompt delivered at step 506 and the test performed at step 507 could be configured such that 9-1-1 is called if the client does not press button 302 during the predetermined time interval, rather than if the client does press button 302. In that configuration the default behavior of communications device 301 would be to call 9-1-1 when private response center 204 cannot be reached.

The test depicted at step 507 is one example of communications device 301 recognizing that it is in a particular state. In the example of FIG. 5, the particular state that causes 9-1-1 to called is that an input is received from a user of communications device 301 indicating that 9-1-1 is to be called. That is, the user pressed button 302 within the predetermined time interval. In another embodiment, as described above, the particular state that causes 9-1-1 to be called may be that no input was received from the user during the predetermined time interval.

Many other variations are possible. For example, the client could be prompted to shake communications device 301 to indicate that 9-1-1 should be called, or some other mechanical manipulation of communications device 301 could be sensed. Or the client could provide an audible cue to communications device 301 that 9-1-1 is to be called, for example by speaking into microphone 303 during a predetermined time interval. In some embodiments, communications device 301 may include voice recognition software that enables communications device 301 to recognize the audible cue from the client. When voice recognition software is present, more extensive interaction may be possible between the client and communications device 301 than simply indicating whether 9-1-1 is to be called, and communications device 301 may be directed to take any of several actions. For example, the client may say "call 9-1-1" to instruct communications device 301 to call 9-1-1. In another example, the client may say "call another number" to direct communications device 301 to call an alternate number. The client may then may speak the number that communications device 301 is to call, and may be prompted to do so by communications device 301. In another example, the client may say "do nothing" or "hang up" to indicate that no action is to be taken. Communications device 301 may audibly interact with the client, for example prompting the client to indicate what action is to be taken, listing possible actions to be taken and the voice commands that initiate them, repeating inputs from the client to verify accuracy, and the like.

In the example of FIG. 5, communications device 301 may alter the behavior of its input interface when it recognizes that the call to private response center 204 did not complete. In ordinary use, single button 302 may be used both to initiate a call to private response center 204 and to terminate the call. However, once it is recognized that an attempted call to private response center 204 did not go through, the behavior of button 302 may be changed, so that pressing button 302 within the predetermined time interval causes communications device 301 to call 9-1-1, rather than terminating a call or placing communications device 301 in an idle state.

In some cases, a call to private response center 204 may fail to complete even if the telephone network is functioning properly. For example, a call from communications device 301 may connect to private response center 204, but private response center 204 may be experiencing heavy call volume, and may place the call on "hold" or into a queue for answering. An automated voice response system, which may be part of computer system 401, may inform the client of the expected wait time or provide other information until customer service representative 404 can pick up the call in person. If the client calling private response center 204 has an emergency, this answering delay may be detrimental. In this scenario, the call from communications device 301 to private response center 204 connects normally, and communications device 301 by itself may have no way to detect whether the connected call was answered by customer service representative 404 or by an automated system. Even if the voice response system indicates to the client that the call will not be handled promptly and that the client should call 9-1-1 if the call relates to an emergency, problems may still arise. For example, communications device 301 may have a simplified interface as shown in FIG. 3, wherein the single button 302 is configured to call private response center 204. Even though communications device 301 may be capable of calling numbers other than that of private response center 204, the user may have no way to initiate such a call. To call 9-1-1 (or another preselected alternate number) the client would then have to locate another working telephone. If the client is incapacitated, this may not be possible.

In some embodiments, communications device 301 can still detect that the call did not complete (did not reach a customer service representative), either on its own or based on the behavior of private response center 204. For example, communications device 301 may include voice recognition software that recognizes the content of a recorded voice message supplied by a voice response system. Communications device 301 may determine from the voice message that the call will not be handled within a predetermined expected answering time, for example two minutes, and may conclude that the call has therefore not completed. The predetermined expected answering time be any suitable interval, for example 30 seconds, one minute, two minutes, five minutes, or another time interval.

In some embodiments, automated systems at private response center 204 interact with communications device 301 so that the user may be redirected to 9-1-1 in the case of an emergency, when private response center 204 cannot handle the user's call immediately.

Figure 6:
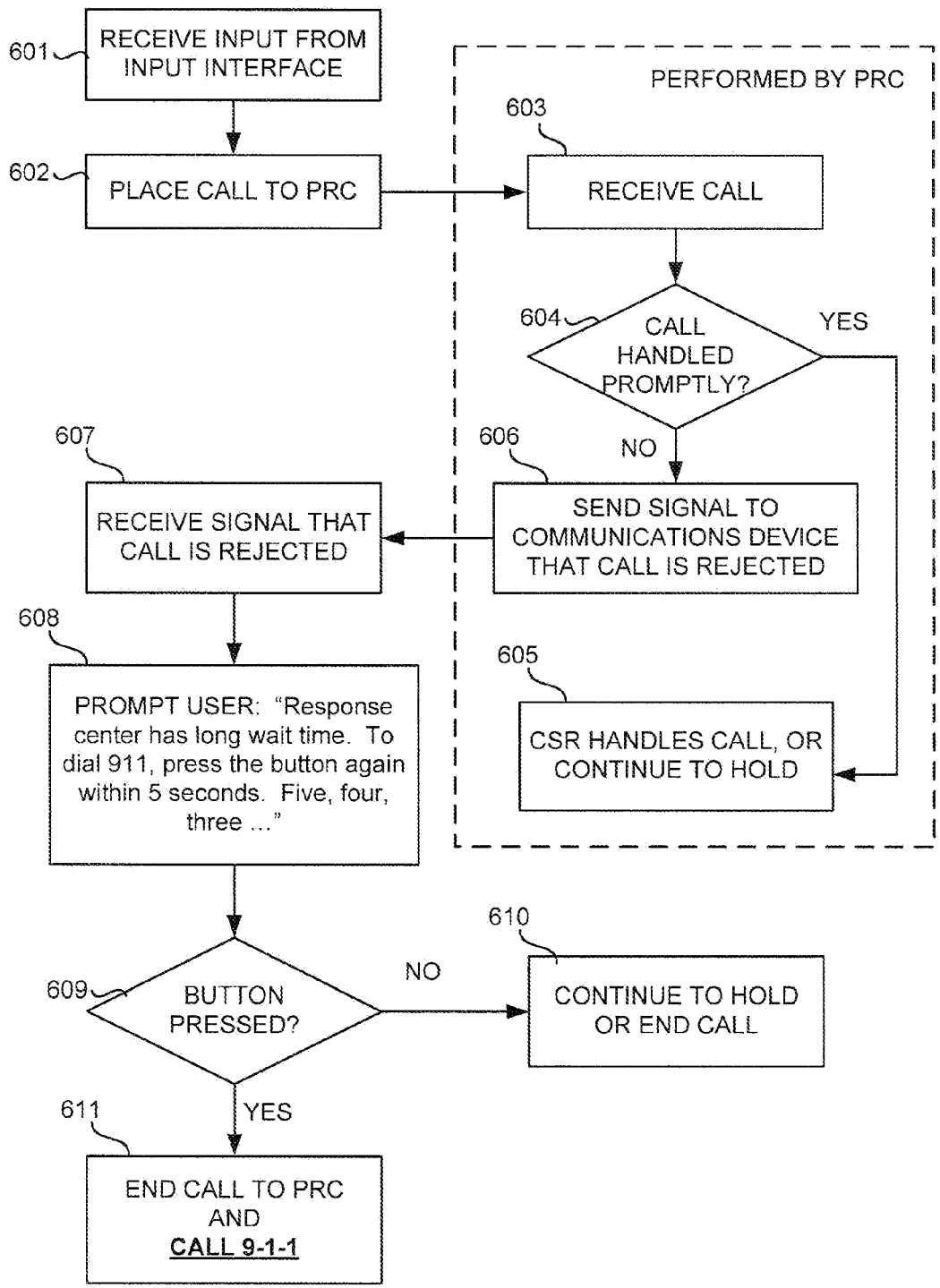
FIG. 6 illustrates an interaction of a private response center and a communications device, in accordance with embodiments.

FIG. 6 illustrates one kind of interaction of private response center 204 and communications device 301 in accordance with embodiments.

In step 601, communications device 301 receives an input indicating that a call is to be placed to private response center 204. For example, a user of communications device 301 may push button 302, or a user of a different kind of communications device may dial a telephone number or press a sequence of keys. At step 602, communications device 301 calls private response center 204.

At step 603, private response center 204 receives the call. At step 604, private response center 204 checks to see if the call will be handled promptly by customer service representative 404. If so, the call is handled normally, either immediately by customer service representative 404, or the call is placed on hold for a short time, as shown in step 605.

If the call cannot be handled immediately or within a predetermined time, private response center 204 sends a signal to communications device 301 rejecting the call, as shown in step 606. For the purposes of this disclosure, to "reject" a call simply means to send a signal indicating that some circumstance interferes with the prompt handling of the call by private response center 204. Private response center 204 preferably does not disconnect the call. As indicated at step 607, communications device 301 receives the rejection signal. (If no signal is received, the call proceeds as normal.)

The signal indicating that the call is rejected may take any suitable form. For example, equipment associated with private response center 204 may cause a series of dual-tone multiple-frequency (DTMF) tones to be transmitted on the line. In other embodiments, another kind of audio signal could be transmitted over the open phone line as the signal. Communications device 301 may be configured to recognize the DTMF tones or other audio signal as the signal indicating that the call is rejected. In other embodiments, private response center 204 may send a short message service (SMS) or another kind of text-based message to communications device 301 indicating that the call is rejected. Other kinds of signals may also be used to indicate that a call is rejected. For example, private response center 204 may place a telephone call to the calling device to indicate the rejection of the call. In an example of this scenario, communications device 301 may use a call waiting or caller identification feature to recognize that the number from which the incoming call originated is a number associated with private response center 204, and indicates that the outgoing call previously placed using communications device 301 is rejected. The number may be a reserved number, reserved for call rejection purposes. In some embodiments, the technique of using a telephone call to reject a call may require two telephone lines. In any case, private response center 204 communicates to communications device 301 that the call placed to private response center 204 using communications device 301 will not be answered promptly by customer service representative 404.

Communications device 301 may then prompt the client to indicate whether 9-1-1 should be called, as illustrated in step 608. For example, communications device 301 may play an audible prompt through speaker 304, prompting the user to press button 302 again if the call relates to an emergency. In step 609, communications device 301 recognizes whether button 302 has been pressed or not. If not, the call may be ended, or may continue to hold, as shown in step 610. If button 302 is pressed, communications device 301 terminates the call to private response center 204 and calls 9-1-1, as shown in step 611.

Other variations are possible. In the example described above, communications device 301 recognizes that it is in a particular state that indicates that 9-1-1 is to be called—namely that the call has been rejected and the user has indicated by pressing button 302 that 9-1-1 is to be called. Other particular states could be used. For example, the user could be prompted that 9-1-1 will be called unless button 302 is pressed within a certain time interval. In that case, the particular state that indicates 9-1-1 is to be called is that no input has been received from a user of the communications device 301 within the predetermined time interval In other embodiments, communications device 301 may automatically call 9-1-1 when a call is rejected, in which case the state that indicates 9-1-1 is to be called is simply that the call to private response center 204 was rejected. In another possible variation, the user prompt could be supplied by private response center 204 over the phone line, rather than being generated locally by communications device 301.

In some embodiments, communications device 301 may alter the behavior of its input interface after recognition of the signal indicating the call has been rejected by private response center 204. For example, in normal operation when a call to private response center 204 is handled promptly by customer service representative, a subsequent press of button 302 may terminate the call. However, once communications device 301 recognizes that the call is rejected, it may change its behavior such that a subsequent press of button 302 results in a call to 9-1-1.

Figure 7:
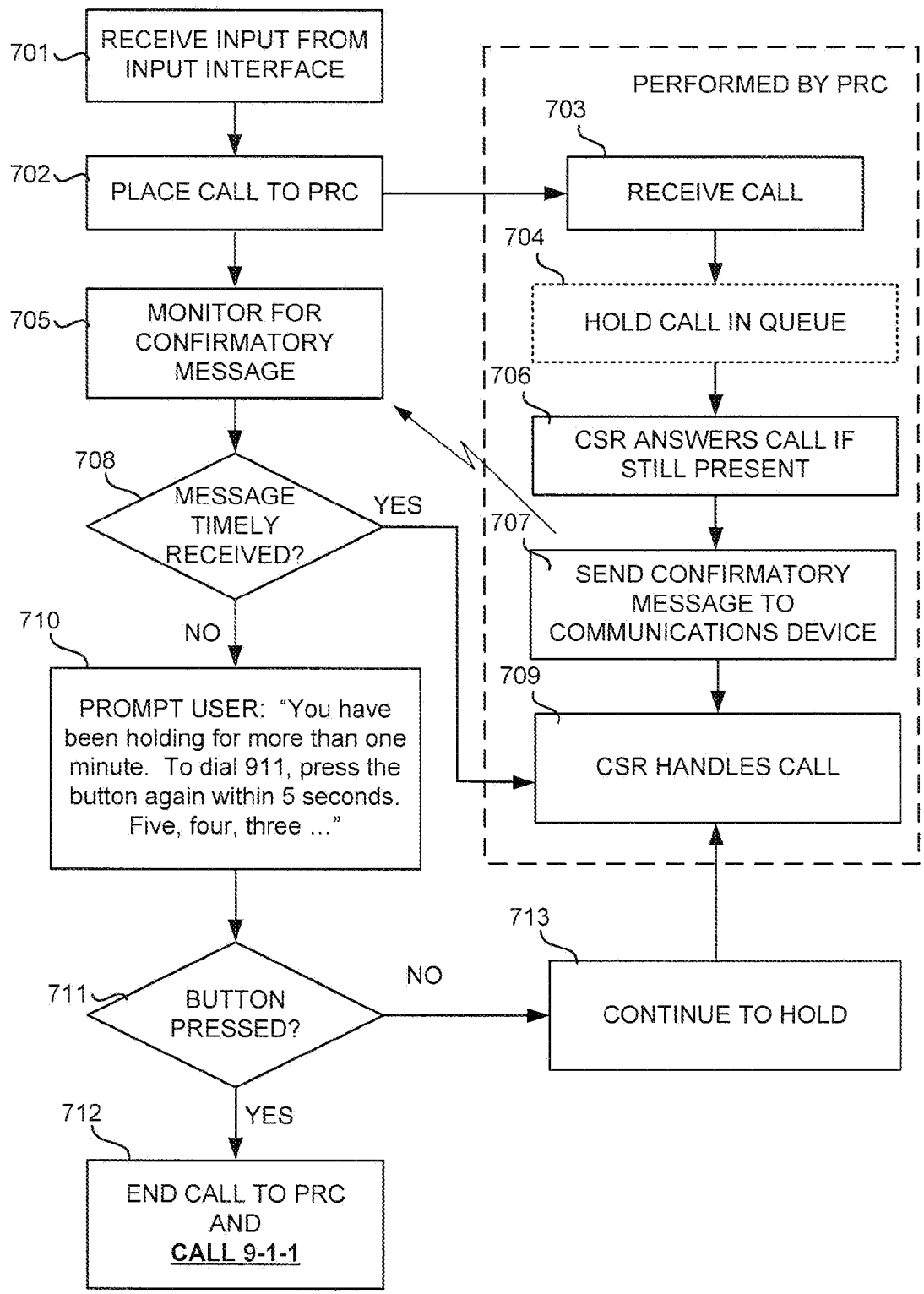
FIG. 7 illustrates another kind of interaction of a private response center and a communications device, in accordance with embodiments.

FIG. 7 illustrates another kind of interaction of private response center 204 and communications device 301 in accordance with embodiments. In this scenario, private response center 204 may have a policy of sending a confirmatory message to the initiating device when a call is taken up by customer service representative 404. For example, when a call is received from communications device 301, the call may be answered immediately by customer service representative 404, and a confirmatory SMS message sent to communications device 301 confirming that the call has been answered. Or, the call may be initially placed on hold or in an answering queue, and answered later by customer service representative 404. In that case, the confirmatory message is delayed until the call is answered by customer service representative 404. The confirmatory message may take any suitable form. For example, the confirmatory message may be another kind of text-based message. In another example, private response center 204 may place a telephone call back to communications device 301 in parallel with the original call in which communications device 301 called private response center 204. In this scenario, communications device 301 may use a call waiting or caller identification feature to recognize that the incoming call is from private response center 204, and may then recognize that the call is a confirmatory message. For example, the incoming call may be from a telephone number dedicated for use for confirmatory messages.

As illustrated in FIG. 7, in step 701, communications device 301 receives an input indicating that a call is to be placed to private response center 204. For example, a user of communications device 301 may push button 302, or a user of a different kind of communications device may dial a telephone number or press a sequence of keys. At step 702, communications device 301 calls private response center 204. At step 703, private response center 204 receives the call, and may optionally place the call on hold in step 704. In parallel, once the call is placed, communications device 301 begins at step 705 monitoring incoming messages for a corresponding confirmatory message indicating that the call has been answered by customer service representative 404. If customer service representative 404 answers the call immediately or quickly at step 706, and sends the confirmatory message at step 707, then communications device 301 recognizes at step 708 that the confirmatory message has been timely received (within a predetermined maximum hold time after placing the call), and customer service representative handles the call as normal at step 709. In some cases, the caller and customer service representative 404 may already be conversing during the sending and receipt of the confirmatory message. Any suitable maximum hold time interval may be used, for example 30 seconds, 1 minute, 2 minutes, 5 minutes, or another time interval.

However, if no confirmatory message arrives at communications device 301 within the predetermined interval, communications device 301 may conclude that the call has not completed and prompts the user at step 710 whether an alternate number such as 9-1-1 should be called. If the user indicates that the alternate number is to be called, for example by pressing the button, communications device 301 recognizes that fact at step 711. Communications device 301 then terminates the call to private response center 204 and calls the alternate number at step 712. If the caller does not indicate that the alternate number is to be called, then the call continues to hold at step 713, and is answered in turn by customer service representative 404.

Other variations are possible, as described above. For example, communications device 301 may terminate the call to private response center 204 and call the alternate number if the caller does not press the button. And while embodiments have been described primarily as redirecting a call to an emergency services telephone number such as 9-1-1, it will be recognized that other alternate numbers may be used. For example, communications device 301 may be programmed to call a family member of the user if it is not possible immediately reach customer service representative 404 at private response center 204.

Embodiments exemplified by FIG. 7 may have the advantage that any kind of failure to complete a call is handled automatically. When no confirmatory message is received, communications device 301 can act accordingly to redirect the call to 9-1-1 or another alternate number, whether the failure to receive a confirmatory message was due to a network outage that prevented private response center 204 from receiving the call, or whether the failure to receive a confirmatory message was due to the inability of private response center 204 to connect the call with a customer service representative immediately. In these embodiments, the correct result is achieved in either case, and does not depend on the positive rejection of a call by private response center 204.

Figure 8:
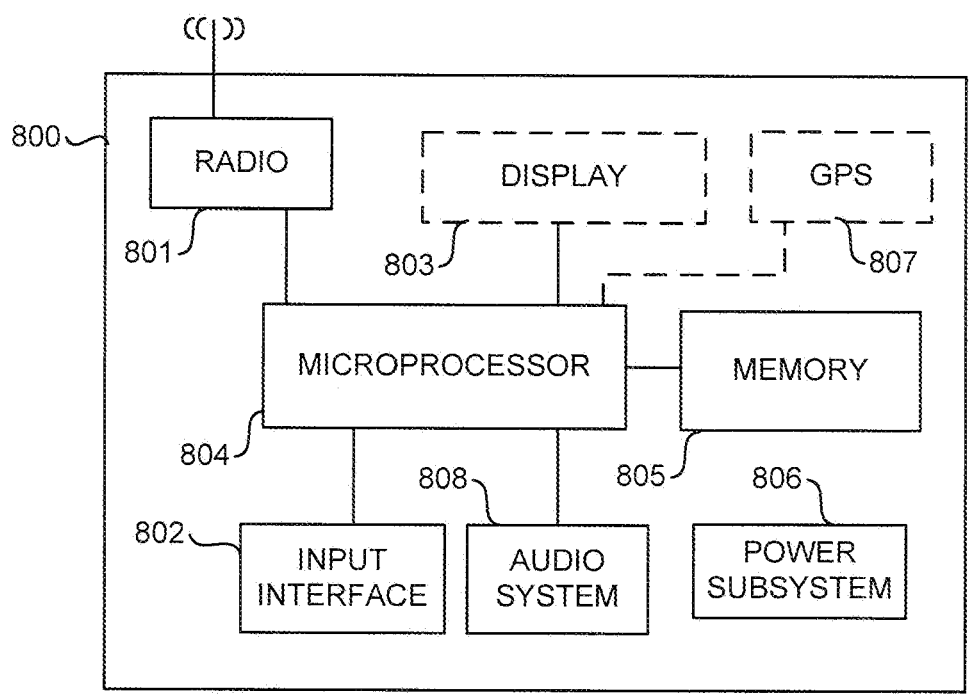
FIG. 8 illustrates a simplified block diagram of an exemplary communications device suitable for use in embodiments.

FIG. 8 illustrates a simplified block diagram of a communications device 800, suitable for use in embodiments. Communications device 800 may be a simplified communicator such as communications device 301, or may be another kind of communications device. Communications device 800 includes a radio transceiver 801 for communicating with network 100, an input interface 802 for receiving inputs from the user of communications device 800. Input interface 802 may include a single button or a multi-key keypad, and may include a microphone, an accelerometer, or other input devices. A display 803 may optionally be included for communicating information to the user. Display 803, if included, may comprise any means of visually communicating information to the user. For example, display 803 may comprise a backlit or passive liquid crystal display (LCD) or another kind of display capable of showing graphical or alphanumeric information. Display 803 could comprise a simple set of indicator lights, for example made of light emitting diodes or another kind of light source. Many other kinds of displays are possible. The operation of communications device 800 is controlled by a microprocessor 804 executing instructions stored in a computer readable memory 805. The instructions, when executed by microprocessor 804, cause communications device 800 to perform steps in accordance with embodiments. Computer readable memory 805 may include volatile memory, non-volatile memory, reprogrammable memory, or a combination of these. Microprocessor 804 may be any suitable kind of processor, for example a complex instruction set microprocessor, a reduced instruction set microprocessor, a digital signal processor, a microcontroller, or any other circuitry or combination of components that performs similar functions. A power subsystem 806 routes power to the other components. Optionally, a global positioning system (GPS) receiver 807 may be included, enabling communications device 800 to accurately determine its location via GPS. In some embodiments, the power subsystem may include a battery and provision for recharging the battery. An audio system 808 may include such items as a microphone and a speaker, and may provide for audio communication with the user. Other audio functions may also be provided. The depiction of communications device 800 in FIG. 8 is simplified, and other components may be present.

Some embodiments described above provide mechanisms for a device to call 9-1-1 when a call to PRC 204 has not reached a person. In the above embodiments, the device calls 9-1-1 upon the rejection of a call to PRC 204, or upon the failure to receive a confirmatory message from PRC 204 within a predetermined time. In other embodiments, PRC 204 and the client's device cooperate to call the PSAP when the client's call is answered by a customer service representative at PRC 204. These embodiments may provide other advantages in the handling of the calling client's situation, arising from the fact that PRC 204 may not receive calls in all localities. For example, PRC 204 may have call centers in one or a handful of locations in the United States, but may serve clients nationwide or in international locations.

As is described above, a customer service representative 404 at PRC 204 may recognize that an incoming call to PRC 204 relates to an emergency, and that official emergency response personnel are needed. Preferably, customer service representative 404 has knowledge of the calling client's location. For example, the client's calling device, such as device 301 may have reported its location periodically to PRC 204 so that in the event of a call from the device to PRC 204, the answering customer service representative 404 knows the client's location and can assist the client more effectively. Methods and systems for the reporting of client locations are described more fully in U.S. Pat. No. 8,489,066 to Imming et al., issued Jul. 16, 2013 and titled "Systems and Methods for Identifying Caller Locations", the entire disclosure of which is hereby incorporated by reference herein for all purposes. Alternatively, customer service representative 404 may have knowledge of the calling client's location via voice communications, WIFI SSID lookup, or by via short range communication between devices, using technologies such as Wi-Fi direct Z-Wave, Zigbee, Bluetooth, or NFC.

Because PRC 204 may be located far from the calling client, the customer service representative 404 answering a call cannot simply dial 9-1-1, but rather can look up the 10-digit switchboard number of a PSAP in the client's vicinity, and can call that PSAP using that number. Once the call is answered by the PSAP near the client, the customer service representative at PRC 204 can explain the nature of the client's emergency and the call can be connected with the PSAP emergency dispatcher. The customer service representative can then connect the client to the dispatcher. The customer service representative may also stay on the line in a three-way call to advocate on behalf of the client. For example, the customer service representative at PRC 204 may be able to provide a list of the client's medications, as recorded in the client's profile at PRC 204, or may be able to provide accurate location data for a client who is using a mobile telephone.

While this technique may generally be very effective at obtaining emergency assistance for a client of PRC 204 who calls PRC 204 when a direct 9-1-1 call may have been appropriate, in some cases, the indirect nature of the process may cause undesirable delay. For example, the local 10-digit telephone switchboard number of the client's local PSAP may be primarily used for non-emergency general business of the PSAP. Of course, should a call relating to an emergency be received on that line, for example a long-distance report by PRC 204 of an emergency on the part of a client of PRC 204 as described above, the call can be transferred to the emergency dispatcher.

As would be expected, calls made by calling 9-1-1 directly are given the highest priority when received at the PSAP. A call to the 10-digit local number may also be given urgent consideration once it is determined that the call relates to an emergency, but the priority of the PSAP is necessarily the answering of calls that arrive through direct 9-1-1 dialing. Accordingly, there is the possibility that a call received at the PSAP via the 10-digit local number may not be answered as quickly as if the client had dialed 9-1-1 directly. Even when a call to the 10-digit number is answered promptly (as is usually the case), the explanation by the customer service representative 404 at PRC 204 about the nature of the call, and the process of initiating a three-way call with the client may add seconds to the time required for the client to reach the PSAP emergency dispatcher.

Embodiments of the invention may reduce the potential for delay in obtaining emergency assistance for a client of PRC 204 who calls PRC 204 in the event of an emergency. This may be accomplished by having the client's telephone make the call to 9-1-1 locally, rather than PRC 204 making a call to the client's local PSAP via an alternate switchboard number.

Figure 9:
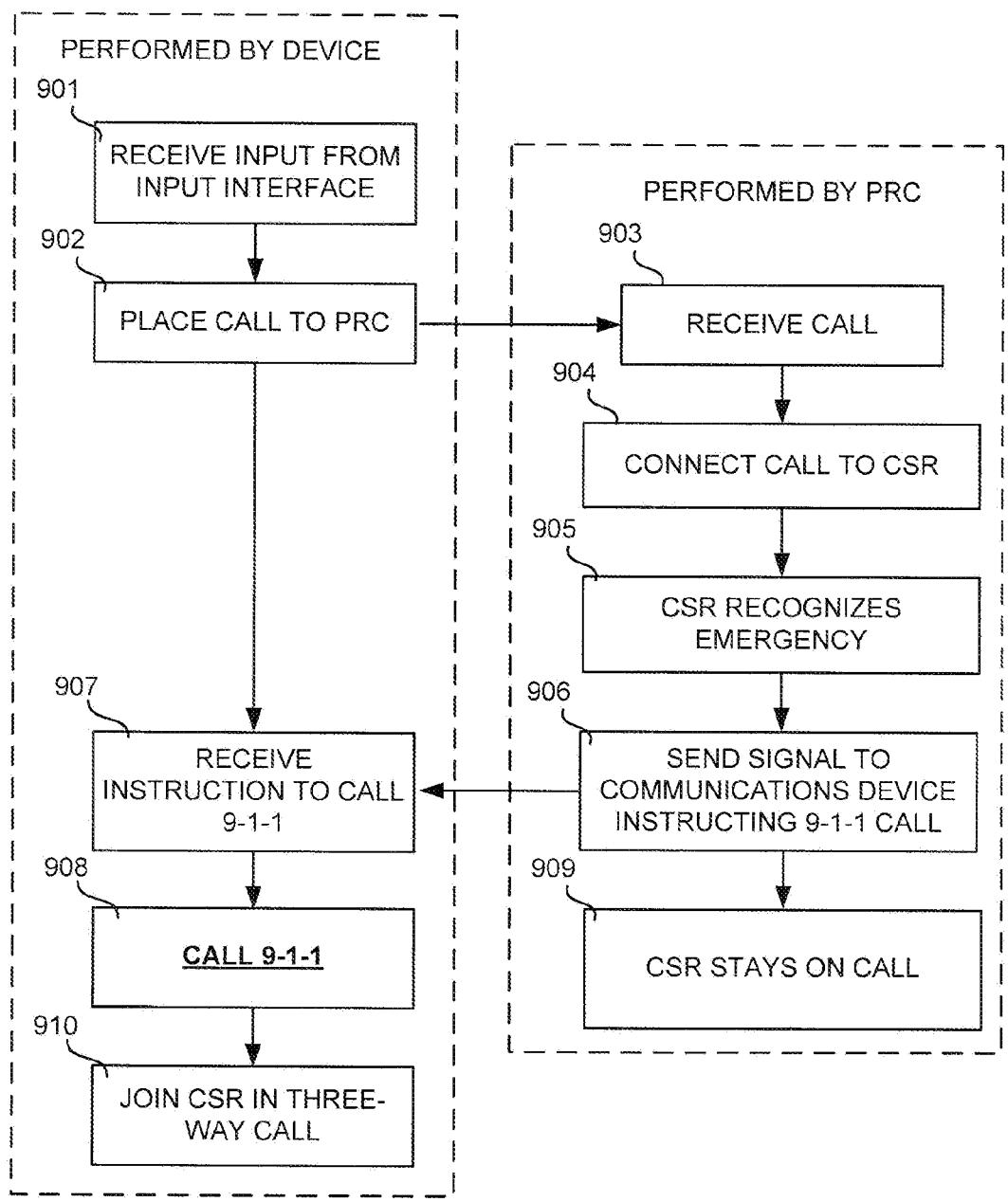
FIG. 9 illustrates another kind of interaction of a private response center and a communications device, in accordance with embodiments.

FIG. 9 illustrates another kind of interaction of private response center 204 and a communications device such as communications device 301, in accordance with embodiments. In step 901, communications device 301 receives an input indicating that a call is to be placed to private response center 204. For example, a user of communications device 301 may push button 302, or a user of a different kind of communications device may dial a telephone number or press a sequence of keys. At step 902, communications device 301 calls private response center 204. At step 903, private response center 204 receives the call, which is connected with a customer service representative in step 904. For the purposes of this disclosure, a call is said to have reached a "person" when it reaches a human such as customer service representative 404. A call that is answered automatically and placed in an answering queue by a machine has not reached a person. In step 905, the customer service representative recognizes that the call relates to an emergency, and that assistance from official emergency response personnel is needed at the caller's location. In step 906, PRC 204 sends an electronic signal to the calling device, indicating that the device should call 9-1-1 or another appropriate PSAP. The electronic signal may be sent in any suitable way. For example, computer system 401 may cause a short message service (SMS) message to be sent to device 301 via telephone network 100, the message indicating that the device should call 9-1-1. In other embodiments, computer system 401 may cause one or more dual-tone multiple-frequency (DTMF) tones to be sent over the voice channel to device 301. In any event, the device is programmed to recognize the electronic signal from PRC 204 and to act on it appropriately. In other embodiments, computer system 401 may place a separate telephone call to device 301, and may communicate data, DTMF tones, or another signal to device 301 via the separate telephone call. In other embodiments, the separate call may be placed from a specific telephone number reserved for such calls. In this case, device 301 may be specially programmed to recognize the specific number via a caller identification capability, and the recognition of the reserved number can serve as the signal to call 9-1-1. The separate call need not be answered by device 301.

Preferably, the customer service representative can inform the caller of the impending electronic signal and call to 9-1-1. For example, if DTMF tones are used for the electronic signal, the customer service representative may warn the client that he or she will hear some tones on the line, and will be connected with the 9-1-1 dispatcher, but that the customer service representative will stay on the line to help with the call to 9-1-1.

In step 907, the calling device receives the electronic signal from PRC 204. Device 301 is specially programmed to recognize the electronic signal from PRC 204, to call the PSAP in response to receipt of the signal, in step 908. Thus, the call to the PSAP comes from the device itself, instead of from PRC 204, which may be far removed from the original caller's location, and cannot call the client's local PSAP via direct dialing of 9-1-1 or the appropriate similar local code. Because the call to the PSAP is made via a direct 9-1-1 call by device 301, the call will receive the highest priority treatment at the PSAP.

In step 909, the customer service representative may stay on the call, and the device may automatically join the two calls (to PRC 204 and to 9-1-1) into a three way call at step 910, so that the customer service representative at PRC 204 can advocate on behalf of the client or provide additional assistance.

While embodiments of the invention have been described in the context of emergency calls in the United States, it is to be understood that the invention is not so limited, and may be applicable in other countries, where similar 10-digit local PSAP numbers may not be available. In such cases, the client's device may be instructed to dial a country-specific emergency number, such as 112 for France, or 110 for Japan.

While the principles of the disclosure have been described above in connection with specific apparatuses and methods, it is to be clearly understood that this description is made only by way of example and not as limitation on the scope of the disclosure. For example, embodiments of the invention have been described in relation to a PSAP reached by calling 9-1-1 as is common in North America, but it is intended that the invention not be so limited, and encompasses other dedicated emergency numbers in locations other than North America. Similarly, a PSAP is described above as having a 10-digit switchboard number as is common in North America, but it is intended that the invention encompass telephone systems using different numbers of digits for specific telephone numbers.

What is claimed is:

1. A communications device, comprising:
    an input interface;
    a transceiver;
    a microprocessor; and
    a computer readable memory, the computer readable memory holding microprocessor instructions that, when executed by the microprocessor, cause the communications device to:
        receive an input via the input interface;
        in response to the input, place a first outgoing telephone call to a call recipient that is not a public safety answering point;
        receive from the call recipient via the transceiver an electronic signal indicating that the first outgoing call is rejected by the call recipient, wherein the electronic signal indicating that the first outgoing call is rejected by the call recipient is received after the first telephone call reaches a person;
        in response to the receipt of the electronic signal indicating that the first outgoing call is rejected by the call recipient, prompt a user of the communications device for an indication that a second outgoing call is to be placed to a public safety answering point; and
        place the second outgoing call to the public safety answering point upon receipt of the indication from the user that the second outgoing call is to be placed.

2. The communications device of claim 1, wherein the microprocessor instructions, when executed by the microprocessor, further cause the communications device to join the first and second outgoing calls into a three-way call.

3. The communications device of claim 1, wherein the electronic signal indicating that the first outgoing call is rejected by the call recipient is received as a short message service (SMS) message.

4. The communications device of claim 1, wherein the electronic signal indicating that the first outgoing call is rejected by the call recipient is received as one or more dual-tone multiple-frequency (DTMF) tones.

5. The communications device of claim 1, wherein the electronic signal indicating that the first outgoing call is rejected by the call recipient is received as a third telephone call.

6. A communications device, comprising:
    an input interface;
    a transceiver;
    a microprocessor; and
    a computer readable memory, the computer readable memory holding microprocessor instructions that, when executed by the microprocessor, cause the communications device to:
        receive an input via the input interface;
        in response to the input, place a first outgoing telephone call to a call recipient that is not a public safety answering point;
        receive from the call recipient via the transceiver an electronic signal indicating that the first outgoing call is rejected by the call recipient; and
        in response to the receipt of the electronic signal indicating that the first outgoing call is rejected by the call recipient, place a second outgoing call to a public safety answering point;
    wherein the electronic signal indicating that the first outgoing call is rejected by the call recipient is received after the first outgoing call has been automatically answered by the recipient and while the first telephone call has not reached a person.

7. The communications device of claim 6, wherein the instructions, when executed by the processor, further cause the communications device to automatically place the second call.

* * * * *